US005131628A

United States Patent [19]

Huang

[11] Patent Number: 5,131,628

[45] Date of Patent: Jul. 21, 1992

[54] MECHANICAL JACK

[75] Inventor: Chen S. Huang, Taipei, Taiwan

[73] Assignee: You Jin Industrial Co., Ltd., Taiwan

[21] Appl. No.: 764,886

[22] Filed: Sep. 24, 1991

[51] Int. Cl.$^5$ .............................................. B60P 1/10

[52] U.S. Cl. .................................. 254/7 R; 254/7 B; 254/122; 254/126

[58] Field of Search ............... 254/2 B, 7 R, 7 B, 7 C, 254/9 B, 98, 122, 126, 129

[56] References Cited

U.S. PATENT DOCUMENTS 3,290,008 12/1966 White ................................ 254/122
3,347,523 10/1967 Hankey et al. ..................... 254/122
3,870,278 3/1975 Lee ........................................ 254/98
5,029,814 7/1991 Liesel et al. ........................ 254/122

FOREIGN PATENT DOCUMENTS 2182308 5/1987 United Kingdom .............. 254/7 R

*Primary Examiner*—J. J. Hartman

[57] ABSTRACT

A mechanical jack comprising a base with wheels attached thereon for moving the jack, a primary arm of which an end is pivoted on the base so as to be rotatable with respect to the base, a secondary arm of which an end is pivotally mounted approximately on the middle of the primary arm so as to be rotatable with respect to the primary arm, and a threaded rod threadingly connecting between the free ends of the primary and secondary arms so that when the threaded rod is rotated, the free ends of the primary and secondary arms move towards or away from each other, depending upon the rotation direction of the threaded rod. With the pivoted ends as the rotation centers, moving the free ends of the arms will also heighten the free end of the secondary arm so as to lift a vehicle supported thereon.

6 Claims, 4 Drawing Sheets

MECHANICAL JACK

FIELD OF THE INVENTION

The invention relates generally to a jack and in particular to a portable screw-type jack for vehicle maintenance which can be operated by hands or by an electrical motor.

BACKGROUND OF THE INVENTION

Conventionally, jacks for vehicle maintenance in garages are hydraulic type which provides high output and efficiency. These jacks usually require some expensive high precision hydraulic elements and thus need careful maintenance. Besides, these jacks are bulky and not fit for vehicle-carrying purpose. For those jacks of vehicle-carrying purpose, some are hydraulic type and some are electrical motor driving type. Both comprise complicated and sometimes sophisticated elements and thus expensive.

OBJECTS OF THE INVENTION

It is therefore an object of the present invention to provide a mechanical jack which has simple construction and thus cheap.

It is a further object of the present invention to provide a mechanical jack which comprises no sophisticated elements and thus needs almost no maintenance.

To achieve the above-mentioned objects, there is provided a mechanical jack comprising a base with wheels attached thereon for moving the jack, a primary arm of which an end is pivoted on the base so as to be rotatable with respect to the base, a secondary arm of which an end is pivotally mounted approximately on the middle of the primary arm so as to be rotatable with respect to the primary arm, and a threaded rod connecting between the free ends of the primary and secondary arms so that when the threaded rod is rotated, the free ends of the primary and secondary arms move towards or away from each other, depending upon the rotation direction of the threaded rod. With the pivoted ends as the rotation centers, moving the free ends of the arms will also heighten the free end of the secondary arm so as to lift a vehicle supported thereon.

Other objects and advantages of the invention will be apparent from the following description of the preferred embodiment taken in connection with the accompanying drawing wherein:

DETAILED DESCRIPTION OF THE PREFERRED EMBODIMENT

Figure 1:
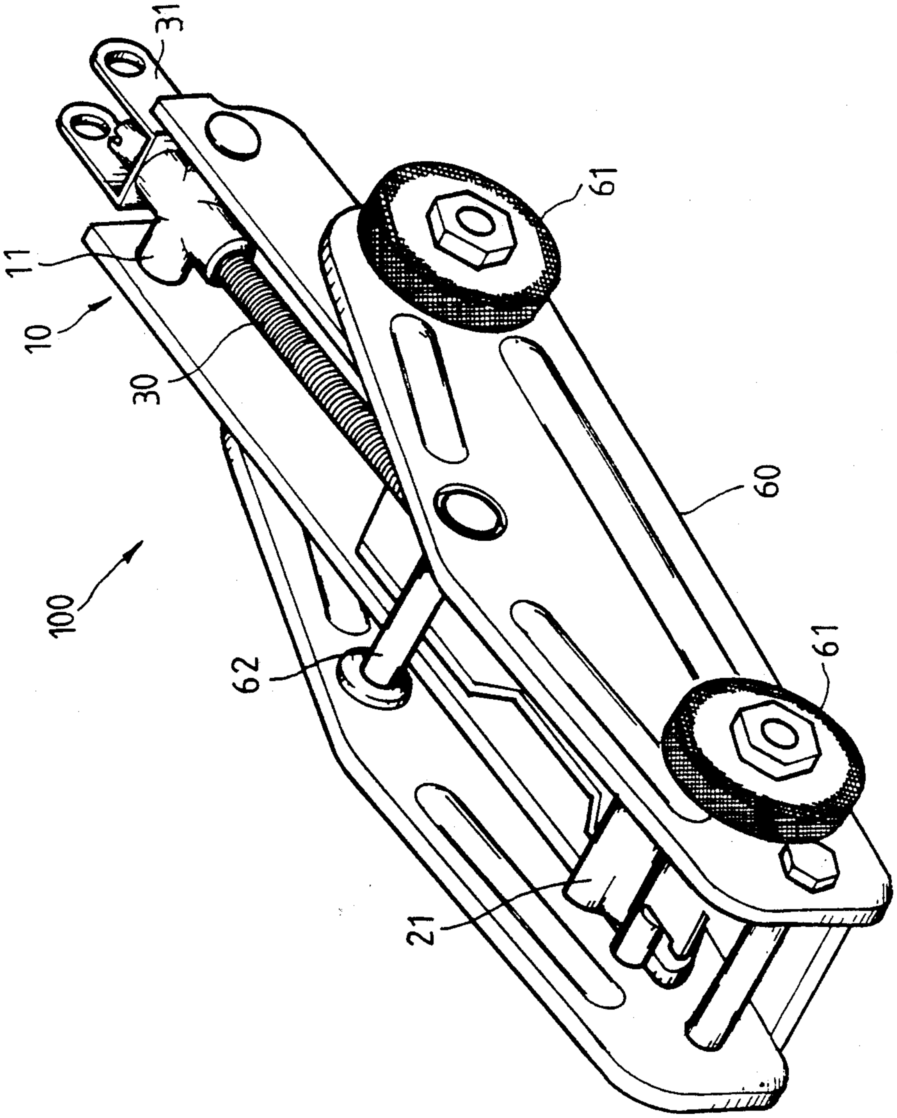
FIG. 1 is a perspective view of a mechanical jack in accordance with the present invention.
Figure 2:
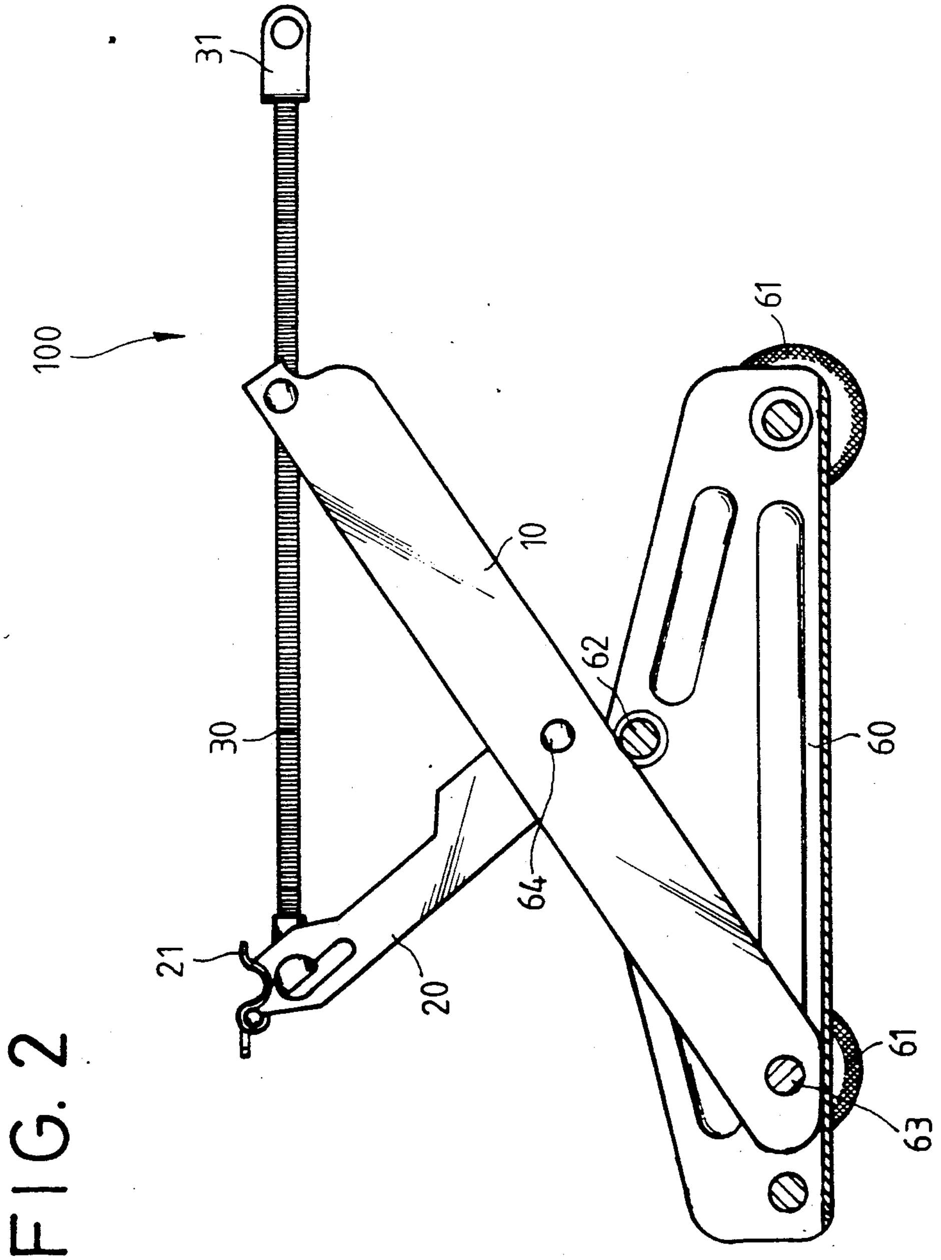
FIG. 2 is a cross-section view of the mechanical jack shown in FIG. 1 showing the jack in a retracted position.
Figure 3:
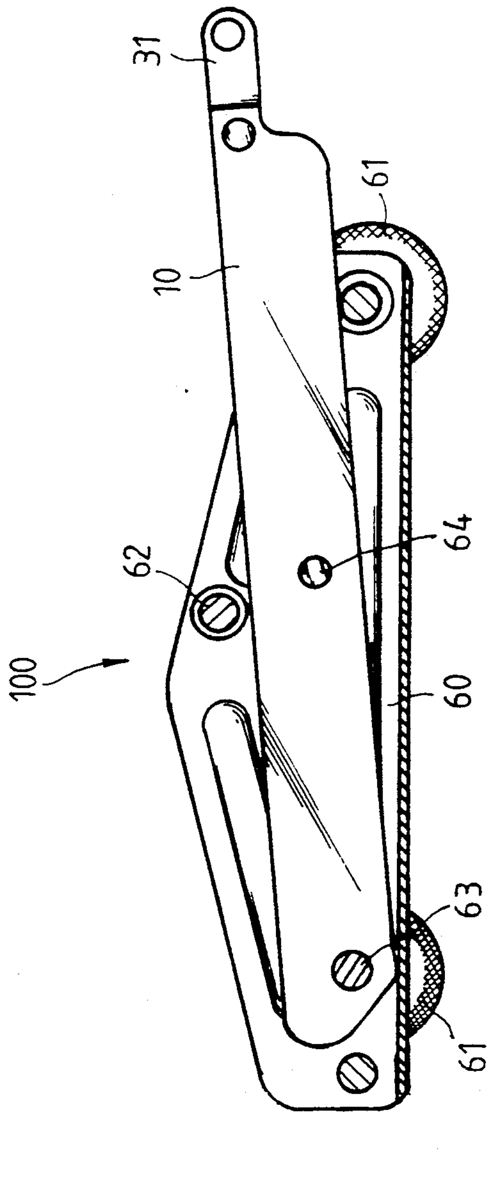
FIG. 3 is also a cross-section view of the mechanical jack shown in FIG. 1 showing the jack in an expanded position.

With reference to the drawing and in particular to FIGS. 1, 2 and 3, a mechanical jack in accordance with the present invention, generally designated with the reference numeral 100, comprises a base 60 with wheels 61 attached thereon for moving the jack 100, a primary arm 10 of which an end is pivoted on the base 60 with a pivotal pin 63 so as to be rotatable with respect to the base 60, a secondary arm 20 of which an end is pivotally mounted approximately on the middle of the primary arm 10 with a pivot 64 so as to be rotatable with respect to the primary arm 10, and a threaded rod 30 which connects between the free ends of the primary and secondary arms 10 and 20 (to be described in detail hereinafter) so that when the threaded rod 30 is rotated, the free ends of the primary and secondary arms move towards or away from each other, depending upon the rotation direction of the threaded rod 30. With the pivots 63 and 64, the primary arm 10 and the secondary arm 20 are rotatable between a retracted position where both arms 10 and 20 are retracted back to reduce the space occupied thereby nd an expanded position where the arms 10 and 20 are extended to lift a vehicle (not shown).

To provide an even more effective lifting action of the jack 100, a supporting pin 62 is removably mounted (e.g. slidably mounted in holes so as to be withdrawable from the holes) on the base 60 at such a location that when the primary arm 10 is supported thereby, the free end of the primary arm 10 is located higher than when it is not supported thereby. The supporting pin 62 is removable so that when it is removed from the base 60, the primary arm 10 is free to rotate with respect to the base 60, and when it is installed on the base 60, it blocks the rotation of the primary arm 10 with respect to the base 60 and can thus support the primary arm 10 when the primary arm 10 is rotated to above the supporting pin 62. To rotate the primary arm 10 above the supporting pin 62, the supporting pin 62 is removed from the base 60 first, the primary arm 10 is then rotated in such a direction to heighten the free end thereof to such an extent that the closest portion of the primary arm 10 to the supporting pin 62 is higher than the location of the supporting pin 62 when the pin 62 is installed and next, the supporting pin 62 is installed back on the base 60 again to support the primary arm 10.

The threaded rod 30 is pivotally connected to the free end of the secondary arm 20 with a first end thereof and threadingly engages with an inner-threaded block 11 which is pivotally attached to the free end of the primary arm 10 so that when the threaded rod 30 is rotated, the secondary arm 20 is rotated with the pivot 64 thereof as the rotation center and the free end thereof is thus moved higher and closer to the free end of the primary arm 10 so as to lift the vehicle supported on a vehicle support 21 formed on the free end of the secondary arm 20. The length of the threaded rod 30 is such that when the arms 10 and 20 are in the retracted position, the threaded rod 30 is almost located between the free ends of the arms 10 and 20.

Figure 4:
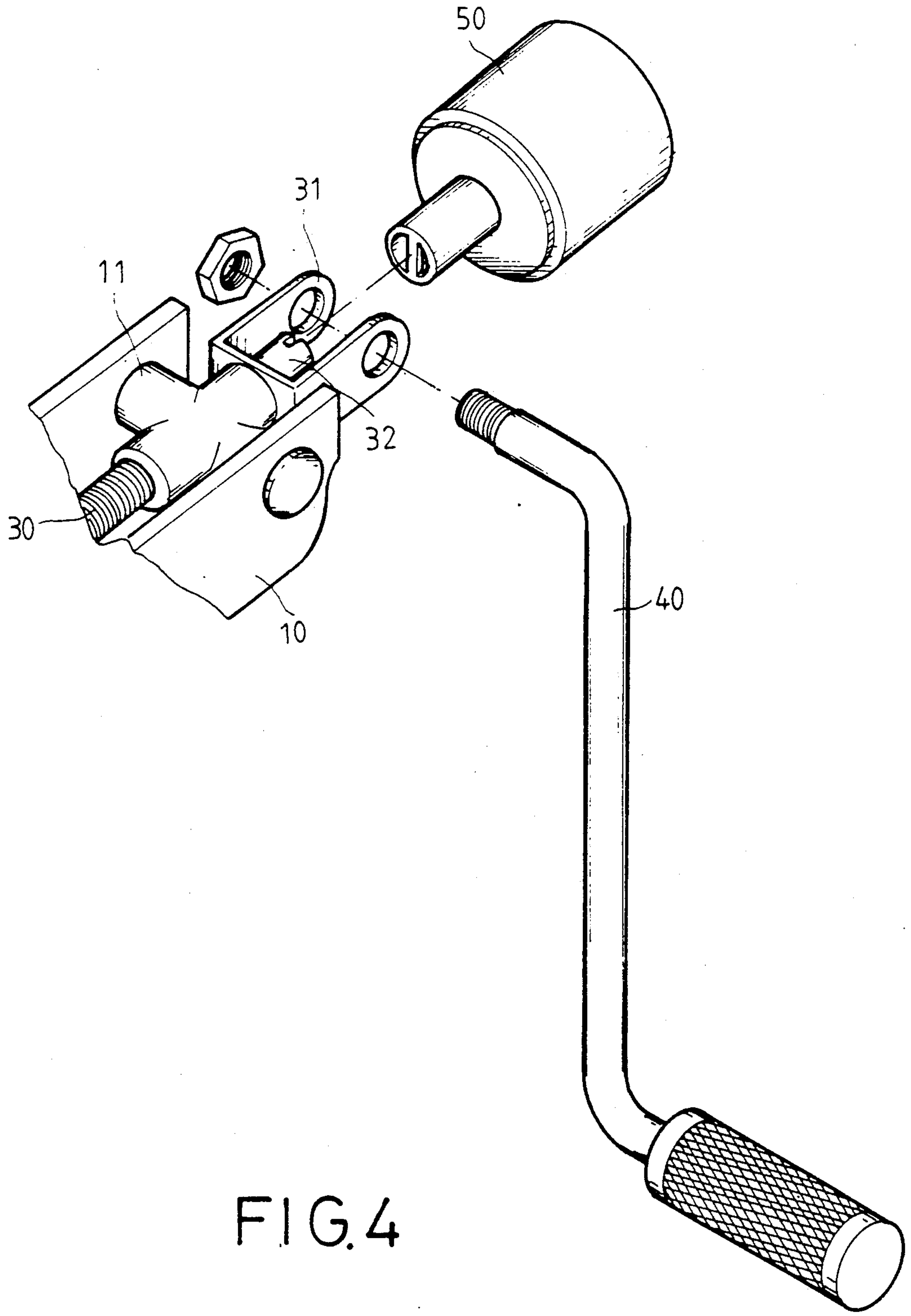
FIG. 4 is an enlarged view showing the use of a manual operation rod or an electrical motor to drive the mechanical jack shown in FIG. 1.

Referring in particular to FIG. 4, a manual operation element 31 having holes 32 is attached on a second end of the threaded rod 30 to allow the penetration of a manual operation rod 40 to rotate the threaded rod 30. A motor operation joint 32 is also provided on the second end of the threaded rod 30 to be engaged and driven by a motor 50 o which the power can be supplied by the power system of the vehicle.

It is apparent that although the invention has been described in connection with the preferred embodiment, it is contemplated that those skilled in the art may make changes to certain features of the preferred embodiment without altering the overall basic function and concept of the invention and without departing from the spirit an scope of the invention as defined in the appended claims.

What is claimed is:

1. A mechanical jack comprising a base with a plurality of wheels attached thereon for moving said jack, a primary arm which has a first end pivoted on said base with a first pivot so as to be rotatable with respect to said base between a retracted position and an expanded position and a second end free to rotate about said first pivot, a secondary arm which has a first end pivotally mounted approximately on a middle position of said primary arm with a second pivot so as to be rotatable with respect to said primary arm between the retracted position and the expanded position and a second end free to rotate about said second pivot, and a threaded rod which threadingly connects between the free ends of said primary and secondary arms so that when said threaded rod is rotated, the free ends of said primary and secondary arms moves towards or away from each other, depending upon the rotation direction of said threaded rod and with said first and second pivots, said movement of the secondary arm also heightening the free end of said secondary arm, said mechanical jack further comprising a supporting pin which is removably mounted on said base at such a position that when said primary arm is moved to the expanded position thereof, the supporting pin is located below the primary pin and thus able to support the primary arm and heightening the free end of the primary arm.

2. A mechanical jack as claimed in claim 1 wherein said supporting pin is slidable with respect to holes formed on said base so as to be withdrawn from and/or inserted into said holes of the base.

3. A mechanical jack as claimed in claim 1 wherein said threaded rod has a first end pivotally connecting to the free end of said secondary arm and wherein said threaded rod engages with an inner-threaded block pivotally mounted on the free end of said primary end so that with said primary arm rests on said supporting pin, the rotation of said threaded rod move the free end of said secondary end toward the free end of said primary arm and thus heightening the free end of said secondary arm.

4. A mechanical jack as claimed in claim 3 wherein said threaded rod has a manual operation element attached on a second end thereon so as to allow the threaded rod rotated manually.

5. A mechanical jack as claimed in claim 4 wherein said manual operation element has holes formed thereon to allow the penetration of a manual operation rod to rotate the threaded rod with the manual operation rod.

6. A mechanical jack as claimed in claim 3 wherein said threaded rod is provided with a motor driving element attached on a second end thereof so as to allow the threaded rod rotated by a motor.

* * * * *